(No Model.) 2 Sheets—Sheet 1.
E. P. LYNCH.
YIELDING SHOVEL FOR CULTIVATORS.
No. 400,467. Patented Apr. 2, 1889.
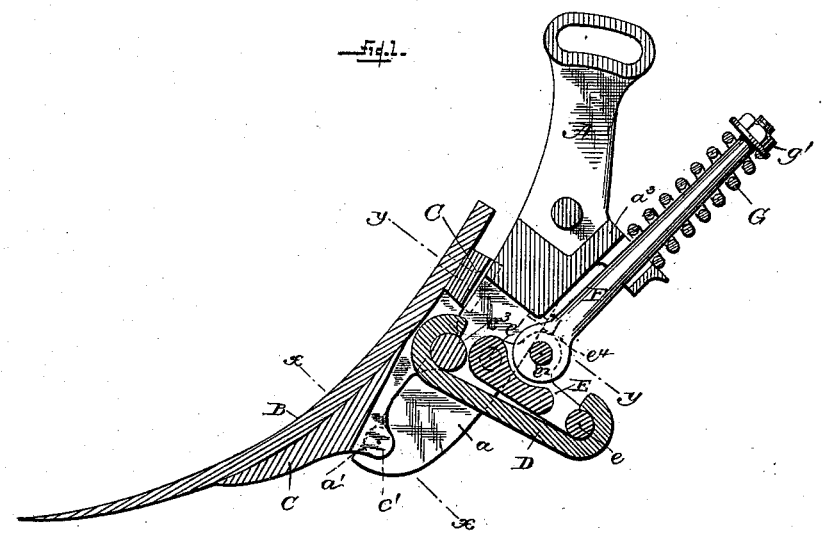
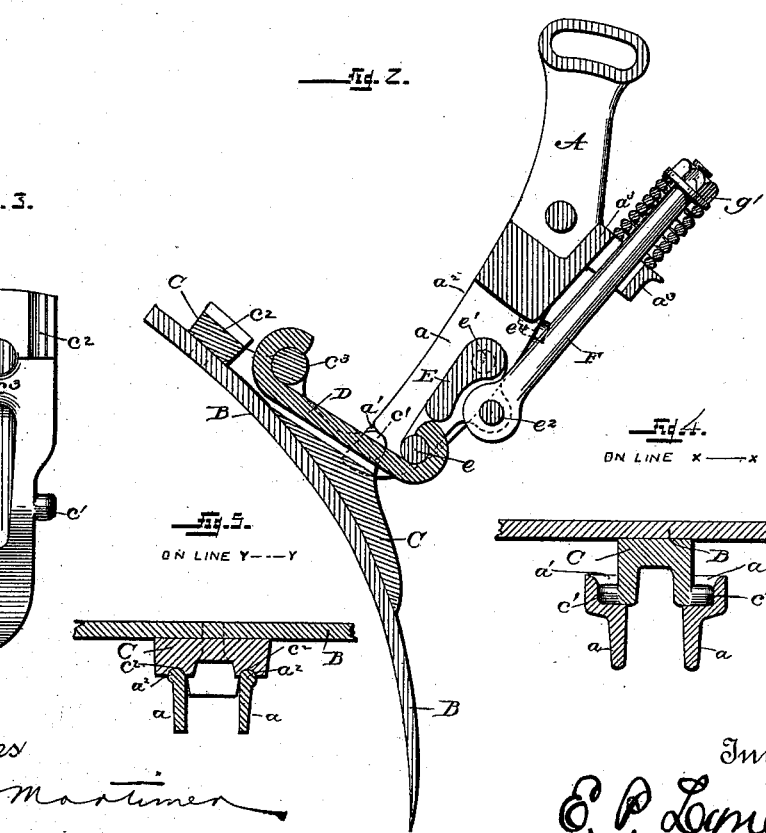
Witnesses
W. W. Mortimer
W. R. Kennedy
Inventor
E. P. Lynch
By Phil. T. Dodge
Attorney

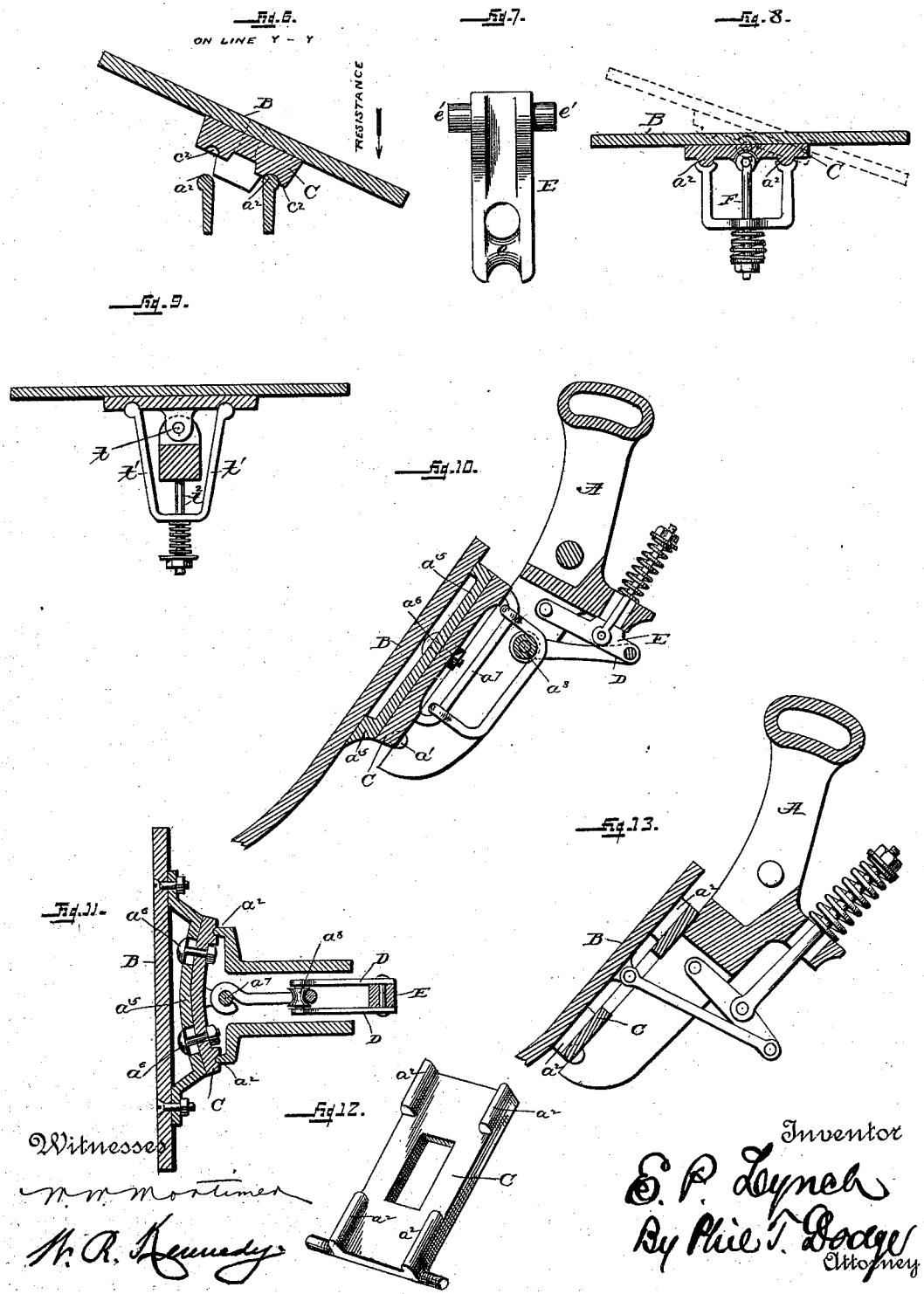

UNITED STATES PATENT OFFICE.

EDWARD P. LYNCH, OF DAVENPORT, IOWA.

YIELDING SHOVEL FOR CULTIVATORS.

SPECIFICATION forming part of Letters Patent No. 400,467, dated April 2, 1889.

Application filed September 27, 1888. Serial No. 286,554. (No model.)

*To all whom it may concern:*

Be it known that I, EDWARD P. LYNCH, of Davenport, in the county of Scott and State of Iowa, have invented certain Improvements in Yielding Shovels for Cultivators, of which the following is a specification.

My invention relates to improved means for supporting and carrying cultivator-shovels, whereby they are adapted to yield upon encountering obstructions not only in a rearward direction at the point, as usual, but also in a lateral or sidewise direction upon meeting obstructions at the edge.

Heretofore many contrivances have been devised for giving the shovels a yielding or spring support in such a manner that they could yield in a backward direction at the point; but so far as I am aware no provision has been made for giving them a spring-support in such manner that they can yield automatically in a backward direction at one side, or, in other words, turn horizontally around an approximately vertical axis to pass obstructions. This horizontal or sidewise motion is of importance when the obstructions meet the upper portion of the shovel or when used in connection with wide shovels, sweeps, or scrapers, such as are in common use.

While I have represented herein a construction which permits the shovel to turn backward at the point around a horizontal axis, and which also permits an independent motion of the shovel horizontally around a vertical axis, it is to be understood that the first provision may be omitted and the shovel permitted to turn only in the horizontal direction automatically around an upright axis against the resistance of the spring tending to keep it in operative position.

It will also be understood that while I prefer the details of construction herein shown the parts may be variously modified in ways which will suggest themselves to the skilled mechanic, provided they permit the shovel to turn against the resistance of a spring around an upright axis, without departing from the scope of my invention.

In the accompanying drawings, Figure 1 is a vertical section in a fore-and-aft direction through a shovel mechanism in accordance with my invention, the parts being in operative position. Fig. 2 is a similar view showing the parts in the positions they assume when the shovel meets an obstruction at the point. Fig. 3 is a rear face view of the shovel-block. Figs. 4 and 5 are cross-sections on the lines $x\ x$ and $y\ y$ of Fig. 1. Fig. 6 is a cross-section on the line $y\ y$, with the shovel tipped laterally. Fig. 7 is a top plan view of a detail hereinafter explained. Figs. 8 and 9 are horizontal sections showing modified forms of the shovel-support and spring-connection to permit the lateral motion of the shovel. Figs. 10 and 11 are a vertical and a horizontal section of another form of my support, on the lines thereon indicated. Figs. 12 and 13 are perspective views of another modification.

Referring to Figs. 1 to 7, A represents a shank or sleeve adapted to be attached to a drag-bar, beam, or other suitable portion of the machine, as usual. The lower end of this shank is divided by a vertical slot or opening extending from front to rear into two arms, $a$. Near their lower ends these arms are each provided in the front edge with a horizontal notch or bearing, $a'$. Each arm is also formed at a higher point on the front edge with a vertical bearing-surface, $a^2$, of rounded form in horizontal section. The shank is also provided on the rear edge, midway of its length or thereabout, with a vertically-perforated ear, $a^3$.

B represents the shovel, and C the shovel-block rabbeted or bolted securely to its rear face. This shovel-block is formed near its lower end with two laterally-projecting trunnions, $c'$, which are seated in the lower bearings, $a'$, of the shank. The shovel-block is also provided near the upper end with two grooves or bearings, $c^2$, which are seated upon or against the respective bearings $a^2$ of the shank. Midway of its length the block is formed with a wrist or journal, $c^3$, rounded in the manner shown.

D represents a link, preferably of round iron, having its ends formed into hooks, one of which is engaged around the journal $c^3$ of the shovel-block, while the other is seated around a wrist, $e$, formed at the rear end of a plate, E. This plate is extended forward into the rear edge of the shank and connected thereto by a horizontal pivot, $e'$.

The upward motion of this link is limited by a stop, $e^4$, which may be either in the form of a screw tapped into the shank, as shown, or in the form of a stationary projection on the shank, or in other suitable form.

Midway of its length the plate is provided with ears, which support a horizontal pivot, $e^2$, passing through the lower end of a rod, F, which is extended thence upward through the ear $a^3$ on the shank. The upper end of the rod is encircled by a strong spiral spring, G, seated upon the ear $a^3$, and acting at the upper end against an adjustable nut, $g'$, applied to the end of the rod. When the parts are in their normal positions, (shown in Fig. 1,) the points $c^3$, $e$, and $e'$ stand nearly in line, the spring acting through the plate E to hold the link D in position, and the latter in turn serving to hold the shovel-block C firmly against the front of the shank on which it is supported, both by its journal $c'$ at the lower end and its bearings $c^2$ at the upper end. If the point of the shovel encounters excessive resistance, the spring yields and the rod F and plate E permit the link to swing forward, so that the shovel may tip backward at the point around the trunnions $c'$, as shown in Fig. 2. During this action the upper end of the shovel swings forward, and the bearings $c^2$ of the shovel-block are carried away from the shank. If the shovel in its normal position encounters excessive resistance at either edge, the spring and its connections will yield as before, and the shovel will swing laterally or horizontally in relation to the shank, the edge of which is subjected to resistance turning to the rear, as shown in Fig. 5. During this tipping action to the side the shovel is supported on the shank and turns upon one of its trunnions $c'$, at the lower end and the corresponding bearing $c^2$, at the upper end, the trunnion and bearing at the opposite side being lifted momentarily away from the shank.

It will be perceived that the block has in fact four bearings on the shank—two at the lower end and two at the upper, two on one side and two on the other—and that the backwardly-pulling link acts between these bearings. Thus it is that the shovel is permitted to tip in a vertical or a horizontal plane, according to the point at which resistance is encountered.

In Fig. 8 the shovel-block has vertical ribs or bearings $a^2$, seated in grooves in the forward edge of the shank, one on each side. The central rod, F, is jointed to the plate, extended through a slot in the shank, and provided with a spiral compression-spring at the rear end. The action of the parts is indicated by dotted lines.

In Fig. 9 the shovel-block is connected to the front edge of the shank by a vertical pivot, $t$, so that it may be turned to the right or left. It is held in position by two arms, $t'$, pivoted to or stepped against the rear face of the shovel-block on opposite sides of the center, their rear ends loosely encircling the rod $t^2$, on which a spiral spring is mounted.

In Figs. 10 and 11 the shank A is provided at the lower end with the horizontal bearings $a'$ and at the upper end with the vertical side bearings, $a^2$, to sustain the shovel-block C, the face of which is rounded and connected to a corresponding plate, $a^5$, rabbeted or otherwise fastened to the shovel. Bolts $a^6$, passing through horizontal and vertical slots, rigidly connect the shovel-plate and plate $a^5$, allowing the shovel to be turned horizontally and fixed in different operative positions to throw the soil right or left, as required.

A stirrup or bail, $a^7$, clasps a vertical rod or journal on the back of the shovel-block. A roller, $a^8$, is seated against the bail on the forward side and connected by links D to an arm or lever, E, which is pivoted to the shank and actuated by a spring in the same manner as the corresponding part in Fig. 1. This spring-connection holds the shovel normally in its operative position.

The hinged connection of the bail to the shovel-block permits the parts to swing to the right and left around their vertical bearings on the shank. The shovel-block tips forward and backward around the horizontal bearings at the lower end, and in so doing the roller $a^8$ rides downward toward the lower end of the bail and toward the axis of the shovel, so that a diminishing resistance is offered as the shovel-point moves to the rear.

In each of the above-described devices the shovel-block has a horizontal tipping motion.

If preferred, the shovel may be constructed, as in Figs. 12 and 13, with horizontal journals or trunnions at the lower end to admit of the shovel tipping backward at the point, and with vertical ribs or bearings $a^2$ on its front face to support the shovel, so that the shovel may rock sidewise without turning the block. When this device is used, the spring-connection will be made directly to the shovel.

While I prefer to retain the details of construction herein shown, and while I prefer to consider the horizontal trunnions $c'$ and the vertical bearings $c^2$ as the means best adapted for supporting the shovel-block upon the shank, it is to be understood that the details of these bearings may be modified within the range of mechanical skill at the will of the mechanic, the only requirement being that the block shall be free to tip in the direction indicated, and that the spring-connections shall act to hold it normally in its operative position.

In place of the peculiar arrangement of the spring and its connections herein shown, other forms of spring—such as are now used in the art with shovels having horizontal axes only—may be employed.

Having thus described my invention, what I claim is—

1. In a cultivator, the combination of a shank or support, a shovel connected thereto by an approximately-vertical axis that it may turn horizontally from its operative position, and a spring resisting said motion, whereby the shovel is permitted to yield and pass obstructions encountered at the side.

2. In combination with a shank or support, a shovel-supporting block mounted thereon to rock both vertically and horizontally, in combination with a spring and intermediate connections tending to prevent said motions.

3. A shovel standard or support having vertical bearings at its two sides, in combination with the shovel-block seated on said bearings, the link acting on the block between the bearings, and a spring acting to urge the link rearward, whereby the shovel is held normally in operative position, but permitted to turn horizontally to the right or left under excessive strain.

4. The shovel-supporting block and the standard connected thereto by the horizontal trunnions and the vertical side bearings, in combination with the central link, the pivoted arm or plate E, rod F, and spring G.

5. In combination with the shank and the shovel-block journaled thereon to tip in a vertical plane, the substantially-horizontal link, the plate E, overlying the link and jointed thereto and to the shank, the rod jointed to the middle of the plate, and the spring, applied as shown.

In testimony whereof I hereunto set my hand, this 13th day of August, 1888, in the presence of two attesting witnesses.

EDWARD P. LYNCH.

Witnesses:
L. H. THIELE,
INGLE BARKER.